United States Patent
Kim et al.

(10) Patent No.: US 9,891,690 B2
(45) Date of Patent: Feb. 13, 2018

(54) DYNAMIC VOLTAGE AND FREQUENCY SCALING OF A PROCESSOR

(71) Applicant: Samsung Electronics Co., Ltd., Suwon-si (KR)

(72) Inventors: Seong-Ki Kim, Yongin-si (KR); Taek-Hyun Kim, Seongnam-si (KR); Sang-Uk Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 23 days.

(21) Appl. No.: 14/739,488

(22) Filed: Jun. 15, 2015

(65) Prior Publication Data

US 2016/0034013 A1 Feb. 4, 2016

(30) Foreign Application Priority Data

Aug. 1, 2014 (KR) ........................ 10-2014-0098764

(51) Int. Cl.
*G06F 1/32* (2006.01)

(52) U.S. Cl.
CPC .............. *G06F 1/324* (2013.01); *G06F 1/329* (2013.01); *G06F 1/3228* (2013.01); *G06F 1/3296* (2013.01); *Y02B 60/1217* (2013.01); *Y02B 60/1285* (2013.01); *Y02B 60/144* (2013.01)

(58) Field of Classification Search
CPC ... G06F 1/324; G06F 1/3296; Y02B 60/1285; G06T 1/20
USPC .................................................. 713/320, 323
See application file for complete search history.

(56) References Cited

U.S. PATENT DOCUMENTS

| | | | |
|---|---|---|---|
| 6,845,456 B1* | 1/2005 | Menezes | G06F 1/3203 713/320 |
| 7,149,909 B2 | 12/2006 | Cui et al. | |
| 7,711,966 B2 | 5/2010 | Prabhakaran et al. | |
| 2006/0031691 A1* | 2/2006 | Bacchus | G06F 1/3228 713/300 |
| 2007/0283176 A1* | 12/2007 | Tobias | G06F 1/3203 713/322 |
| 2009/0049314 A1 | 2/2009 | Taha et al. | |
| 2010/0287319 A1* | 11/2010 | Hill | G06F 9/505 710/220 |
| 2012/0185671 A1 | 7/2012 | Bourd et al. | |
| 2013/0138977 A1 | 5/2013 | Herman et al. | |
| 2013/0173933 A1 | 7/2013 | Ramani et al. | |
| 2013/0196709 A1 | 8/2013 | Nho | |
| 2013/0328890 A1* | 12/2013 | Avkarogullari | G06F 1/3234 345/501 |
| 2013/0339777 A1 | 12/2013 | Varma et al. | |
| 2014/0063026 A1 | 3/2014 | Oh | |

(Continued)

FOREIGN PATENT DOCUMENTS

JP 2010277350 12/2010
JP 4697805 6/2011

*Primary Examiner* — Thomas Lee
*Assistant Examiner* — Santosh R Poudel
(74) *Attorney, Agent, or Firm* — Onello & Mello, LLP

(57) ABSTRACT

A method of Dynamic Voltage Frequency Scaling (DVFS) of a processor includes measuring a first utilization of the processor utilized to execute at least one of a graphic task and a computing task. A second utilization is generated by adjusting the first utilization based on a duration of the graphic task and a duration of the computing task. An operation frequency of the processor is determined based on a comparison of the second utilization with at least one threshold value.

14 Claims, 11 Drawing Sheets

(56) References Cited

U.S. PATENT DOCUMENTS

| | | |
|---|---|---|
| 2014/0068285 A1 | 3/2014 | Lee et al. |
| 2014/0089699 A1* | 3/2014 | O'Connor ............... G06F 1/324 713/322 |
| 2014/0164364 A1* | 6/2014 | Cosgrove ............ G06F 17/3053 707/723 |
| 2014/0164757 A1* | 6/2014 | Dorsey ................... G06F 1/324 713/100 |
| 2016/0034528 A1* | 2/2016 | Roy ........................ G06F 17/30 707/736 |

* cited by examiner

DYNAMIC VOLTAGE AND FREQUENCY SCALING OF A PROCESSOR

CROSS-REFERENCE TO RELATED APPLICATIONS

This application claims priority under 35 USC § 119 to Korean Patent Application No. 10-2014-0098764, filed on Aug. 1, 2014, in the Korean Intellectual Property Office, the disclosure of which is incorporated by reference in its entirety herein.

BACKGROUND

1. Technical Field

Example embodiments relate generally to a Dynamic Voltage Frequency Scaling (DVFS) method, and more particularly to a DVFS method for a processor by controlling operation frequency and operation voltage according to a computing task and a graphic task.

2. Description of the Related Art

As the density of at semiconductor device ("chip") increases, more modules are integrated into the chip. Consequently, the operation frequency of the semiconductor device also increases. Various research has been performed to reduce the power consumption of semiconductor devices. One representative method to reduce the power consumption of the semiconductor device is a DVFS method.

Because a Graphic Processing Unit (GPU) mainly executes graphic tasks using a graphic library (e.g. OpenGL®) in the past, conventional methods of DVFS may determine the threshold values according to an amount of a graphic task, and control the operation voltage and operation frequency of the graphic processor based on a comparison of the utilization of the graphic processor with the threshold values.

Recently, the graphic processor may additionally perform a computing task in addition to the graphic task because of the improved performance of the graphic processor. A DVFS method considering both the computing task and the graphic task is necessary.

SUMMARY

As will be appreciated, embodiments as disclosed include at least the following. In one embodiment a method of Dynamic Voltage Frequency Scaling (DVFS) of a processor comprises measuring a first utilization of the processor utilized to execute at least one of a graphic task and a computing task. A second utilization is generated by adjusting the first utilization based on a duration of the graphic task and a duration of the computing task. An operation frequency of the processor is determined based on a comparison of the second utilization with at least one threshold value.

Alternative embodiments of the method of DVFS of a processor include one of the following features, or any combination thereof. Generating the second utilization includes generating the second utilization being equal to the first utilization when the at least one of the graphic task and the computing task does not include the computing task and generating the second utilization by adjusting the first utilization when the at least one of the graphic task and the computing task includes the computing task. Generating the second utilization by adjusting the first utilization when the at least one of the graphic task and the computing task includes the computing task includes calculating a computing utilization by multiplying the first utilization and a computing ratio of the duration of the computing task to a duration of a total task, calculating a graphic utilization by multiplying the first utilization and a graphic ratio of the duration of the graphic task to the duration of the total task, generating a weighted computing utilization by multiplying a weight and the computing utilization and generating the second utilization b adding the weighted computing utilization and the graphic utilization. Generating the second utilization by adding the weighted computing utilization and the graphic utilization includes generating a third utilization by adding the weighted computing utilization and the graphic utilization, determining the second utilization as a limit utilization when the third utilization is equal to or larger than the limit utilization and determining the second utilization as the third utilization when the third utilization is less than the limit utilization. A duration of a total task is an executing time of the total task on the processor, the duration of the graphic task is an executing time of the graphic task on the processor, and the duration of the computing task is an executing time of the computing task on the processor. A first duration of a total task is equal to a first number of task units included in the total task, a second duration of the graphic task is equal to a second number of task units included in the graphic task, and a third duration of the computing task is equal to a third number of the task units included in the computing task. Determining the operation frequency of the processor based on the comparison of the second utilization with at least one threshold value includes decreasing the operation frequency of the processor when the second utilization is less than a first threshold value. Decreasing the operation frequency of the processor includes maintaining the operation frequency of the processor when the operation frequency is equal to a minimum operation frequency of the processor. Determining the operation frequency of the processor includes increasing the operation frequency of the processor when the second utilization is equal to or larger than a second threshold value. Increasing the operation frequency of the processor when the second utilization is equal to or larger than the second threshold value includes maintaining the operation frequency of the processor when the operation frequency is equal to a maximum operation frequency of the processor. Determining the operation frequency of the processor includes maintaining the operation frequency of the processor when the second utilization is equal to or larger than the first threshold value and the second utilization is less than the second threshold value. At least one threshold value is pre-determined through a plurality of graphic task benchmark programs. The first utilization is a ratio of an executing time of a total task on the processor to a whole operation time of the processor. The processor is one of a graphics processing unit and a general computing processing unit. The processor executes at least one of the graphic task and the computing task by using an OpenCL framework. Measuring the first utilization of the processor is performed when a DVFS event occurs in an operation system running on the processor.

In another embodiment, a method of Dynamic Voltage Frequency Scaling (DVFS) of a processor comprises controlling an operation frequency of the processor, utilized to execute at least one of a graphic task and a computing task, based on a first utilization of the processor, a duration of the graphic task, a duration of the computing task, and at least one threshold value, and determining an operation voltage of the processor based on the operation frequency.

Alternative embodiments of the method of Dynamic Voltage Frequency Scaling (DVFS) of a processor include one or the following features, or any combination thereof. Controlling the operation frequency of the processor includes measuring the first utilization of the processor, generating a second utilization by adjusting the first utilization based on the duration of the graphic task and the duration of the computing task and determining the operation frequency of the processor based on a comparison of the second utilization with the at least one threshold value. Determining the operation frequency of the processor includes determining the operation frequency of the processor from a pre-determined operation frequency. Determining the operation voltage of the processor includes determining the operation voltage from a pre-determined operation voltage corresponding to the pre-determined operation frequency.

In another embodiment, a mobile device comprises an application processor (AP) configured to execute at least one of a graphic task and a computing task, and a power management device configured to modify the performance of the AP in response to a determination of a utilization of the AP, the utilization based on a duration of at least one of the graphic task and the computing task.

Alternative embodiments of the mobile device include one or the following features, or any combination thereof. The power management device is configured to determine the utilization at fixed intervals by calculating a ratio of the total elapsed time of at least one of the graphic task and the computing task over a whole interval comprising a plurality of fixed intervals. The power management device is configured to reduce an operating frequency of the AP when the utilization is less than a low threshold and the AP executes at least one computing task. The power management device is configured to increase an operating frequency of the AP when the utilization is greater than a high threshold and the AP executes at least one computing task. A communication module is configured to receive a display data, a display module configured to display images, and the AP executing a graphic task to render the display images from the display data.

As described above, because a graphic processor GPU mainly executes graphic tasks using a graphic library (e.g. OpenGL) in the past, the conventional method of DVFS may determine the threshold values according to an amount of a graphic task, and control operation voltage and operation frequency of the graphic processor based on the comparison of the utilization of the graphic processor with the threshold values.

Recently, the graphic processor may additionally perform a computing task other than the graphic task because of the improved performance of the graphic processor. DVFS according to example embodiments may operate the graphic processor with a consideration of the characteristic of the tasks by adjusting the utilization of the graphic processor by applying a weight to the computing task executed on the graphic processor, and controlling operation frequency and operation voltage of the graphic processor based on a comparison of the adjusted utilization of the graphic processor with the threshold values.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION

Figure 1:
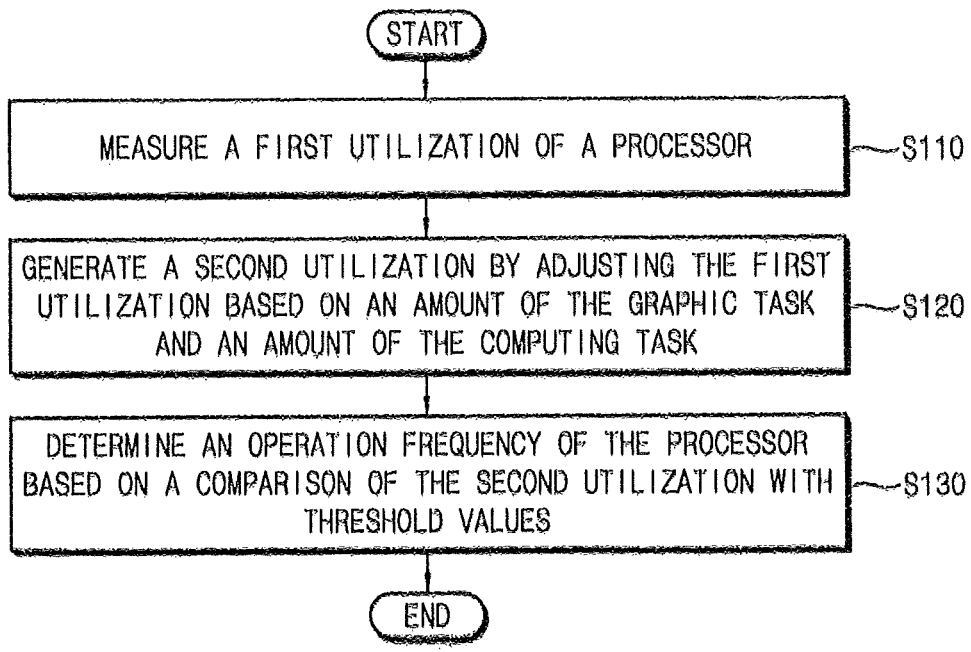
FIG. 1 is a flow chart illustrating a DVFS method according to an example embodiment.

Various example embodiments will be described more fully hereinafter with reference to the accompanying drawings, in which some example embodiments are shown. However, the present inventive concept may be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions or acts noted in the blocks may occur out of the order noted in the flowcharts. For example, two blocks shown in succession may in fact be executed substantially concurrently or the blocks may sometimes be executed in the reverse order, depending upon the functionality or acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIG. 1, when a processor executes tasks including at least one of a graphic task and a computing task, a DVFS method of the processor is performed by measuring a first utilization of the processor at step S110, generating a second utilization by adjusting the first utilization based on an amount of the graphic task and an amount of the computing task at step S120, and determining an operation frequency of the processor based on the comparison of the second utilization with threshold values at step S130.

The graphic task may be a task which is executed on the processor to generate an image using a graphic library. The computing task may be a task that is executed on the processor for a purpose other than the image generation.

In an example embodiment, the processor may be a GPU, a general computer processing unit (CPU), a Digital Signal Processor (DSP) or a field-programmable gate array (FPGA). In an example embodiment, the processor may execute the graphic task and the computing task by using Open Computing Language (OpenCL™).

OpenCL is an open framework for parallel computing currently maintained by the technology consortium Khronos Group. The OpenCL provides a guideline to write a program using various processors (e.g. CPU, GPU DSP or FPGA) included in a heterogeneous platform. Various mobile graphic processors support the OpenCL framework.

In an example embodiment, measuring the first utilization of the processor at stop S110 may be performed when a DVFS event occurs in an Operating System (OS) running on the processor.

In an example embodiment, the OS may generate the DVFS event DVFS EVENTS periodically, and provide the DVFS events DVFS EVENTS to the processor. The DVFS event DVFS EVENTS may be generated with a period ranging from a few milliseconds to hundreds of milliseconds.

Generating the second utilization by adjusting the first utilization based on the amount of the graphic task and the amount of the computing task at step S120) will be described with reference to FIG. 2. Determining the operation frequency of the processor based on the comparison of the second utilization with the threshold values at step S130 will be described with the reference to FIG. 11.

Figure 2:
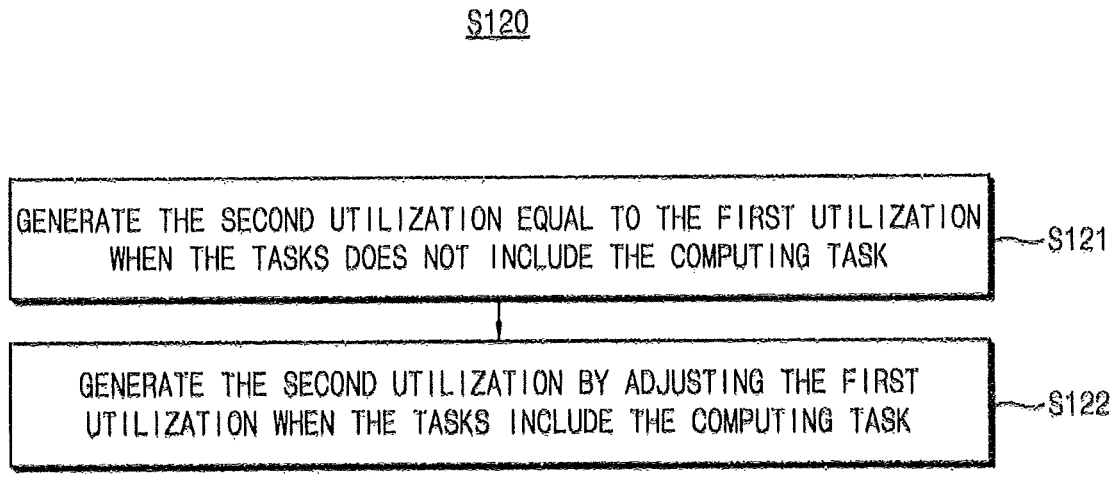
FIG. 2 is a flow chart illustrating generating the second utilization by adjusting the first utilization based on the amount of the graphic task and the amount of the computing task included in the flow chart of FIG. 1.

Referring to FIG. 2, generating the second utilization by adjusting the first utilization based on the amount of the graphic task and the amount of the computing task at step S120 may include a generating the second utilization equal to the first utilization when the tasks does not include the computing task at step S121, and generating the second utilization by adjusting the first utilization when the tasks include the computing task at step S122.

At step S121, the DVFS method according to example embodiments works the same as the conventional DVFS method. Therefore, adjusting the first utilization is not required in this case.

Generating the second utilization by adjusting the first utilization when the tasks include the computing task at step S122 will be described with the reference to FIG. 3.

Figure 3:
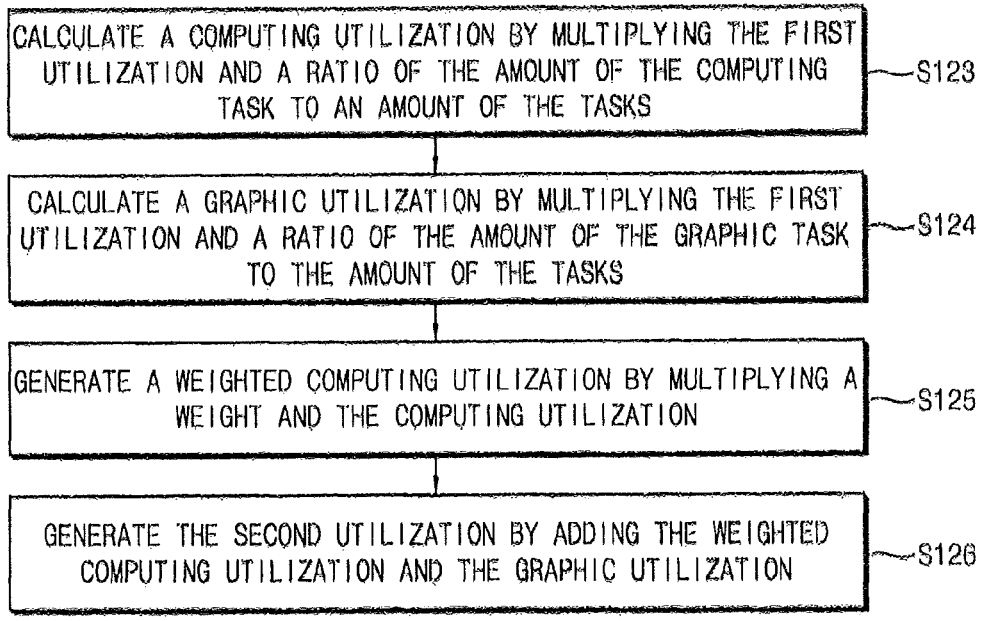
FIG. 3 is a flow chart illustrating generating the second utilization by adjusting the first utilization when the tasks include the computing tasks included in the flow chart of FIG. 2.

Referring to FIG. 3, generating the second utilization by adjusting the first utilization when the tasks include the computing tasks at step S122 may include calculating a computing utilization by multiplying the first utilization and a ratio of the amount of the computing task to an amount of the tasks at step S123, calculating a graphic utilization by multiplying the first utilization and a ratio of the amount of the graphic task to the amount of the tasks at step S124, generating a weighted computing utilization by multiplying a weight and the computing utilization at step S125, and generating the second utilization by adding the weighted computing utilization and the graphic utilization at step S126.

The steps S123 through S126 will be described with reference to FIG. 10.

Figure 4:
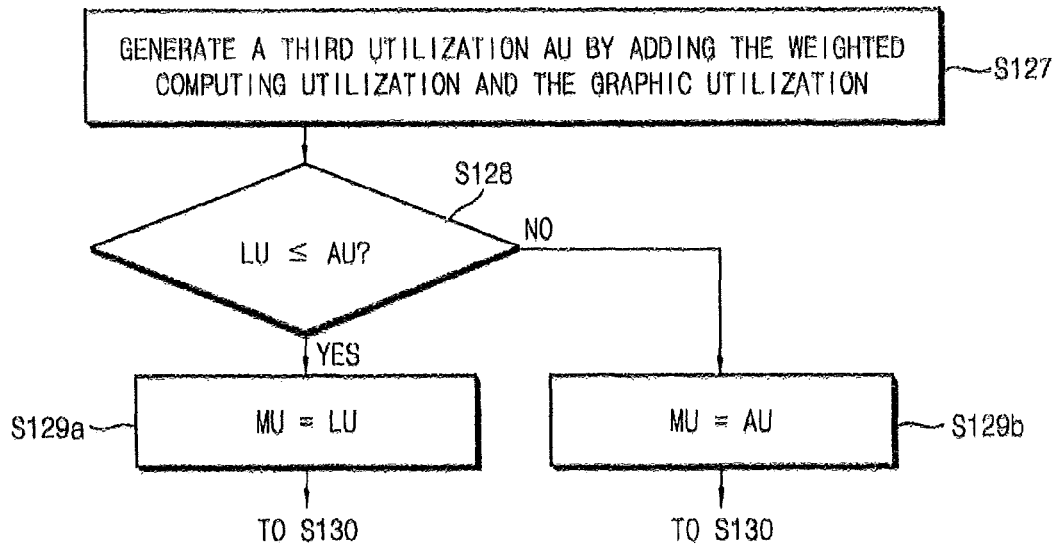
FIG. 4 is a flow chart illustrating generating the second utilization by adding the weighted computing utilization and the graphic utilization in the flow chart of FIG. 3.

Referring to FIG. 4, generating the second utilization by adding the weighted computing utilization and the graphic utilization at step S126 may include a generating a third utilization AU by adding the weighted computing utilization and the graphic utilization at step S127, determining the second utilization (e.g. a modified utilization) MU as a limit utilization LU at step S129a when the third utilization AU is equal to or larger than the limit utilization LU at step S128

(e.g. result of conditional evaluation is YES), and determining the second utilization MU as the third utilization AU at step S129b when the third utilization AU is less than the limit utilization LU at step S128 (e.g. result of conditional evaluation is NO).

Figure 5:
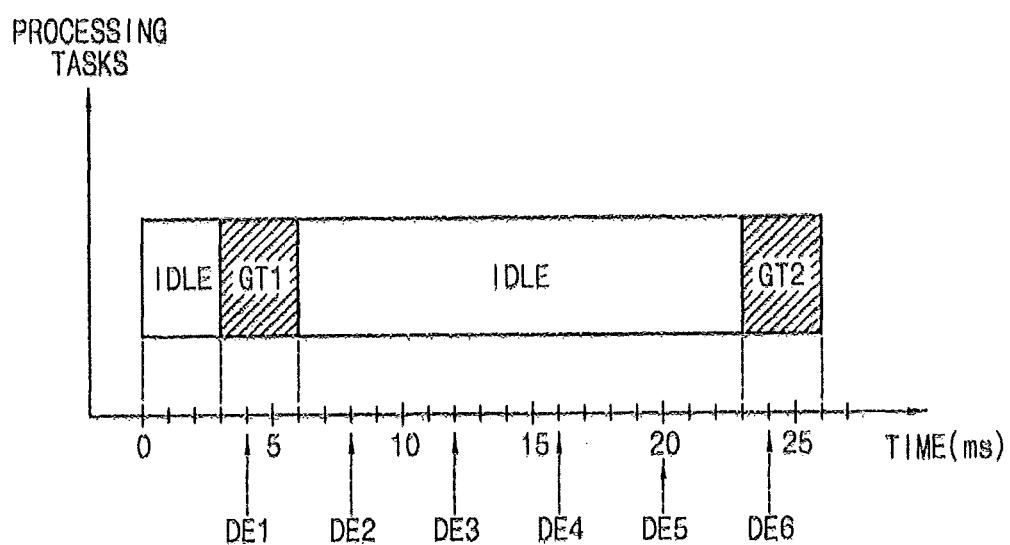
FIG. 5 is a graph illustrating an example embodiment of graphic tasks executed on the processor.

Referring to FIG. 5, the processor executes a first graphic task GT1 and a second graphic task GT2 from 0 ms to 26 ms. From 0 ms to 3 ms, the processor is in idle state IDLE, and does not execute a task. From 3 ms to 6 ms, the processor executes the first graphic task GT1. From 6 ms to 23 ms, the processor is in idle state IDLE, and does not execute a task. From 23 ms to 26 ms, the processor executes the second graphic task GT2.

The OS running on the processor generates a first DVFS event DE1 at 4 ms, a second DVFS event DE2 at 8 ms, a third DVFS event DE3 at 12 ms, a fourth DVFS event DE4 at 16 ms, a fifth DVFS event DE5 at 20 ms and a sixth DVFS event DE6 at 24 ms. The DVFS events DE1 through DE6 are similarly defined in FIG. 6 through FIG. 10, and FIG. 12.

Figure 6:
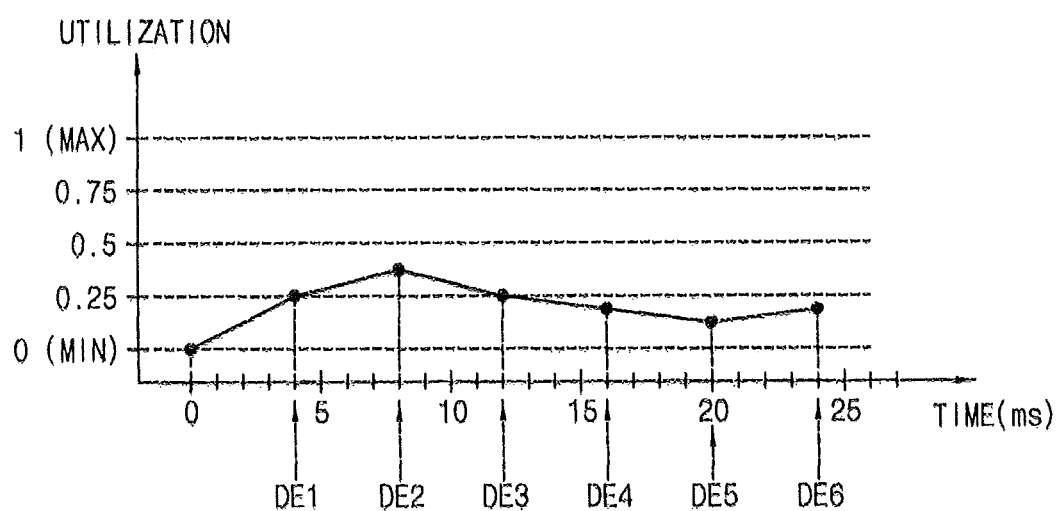
FIG. 6 is a graph illustrating utilization of the processor when the processor executes the graphic tasks of FIG. 5.

Referring to FIG. 5 and FIG. 6, the utilization of the processor may be a ratio of an executing time of the tasks on the processor to a whole operation time of the processor.

The utilization of the processor at DE1 is 0.250 because the whole operation time of the processor until DE1 occurs is 4 ms and the executing time of the first graphic task GT1 on the processor until DE1 occurs is 1 ms. Utilization of the processor at DE2 is 0.375 because the whole operation time of the processor until DE2 occurs is 8 ms and the executing time of the first graphic task GT1 on the processor until DE2 occurs is 3 ms. Utilization of the processor at DE3 is 0.250 because the whole operation time of the processor until DE3 occurs is 12 ms and the executing time of the first graphic task GT1 on the processor until DE3 occurs is 3 ms. Utilization of the processor at DE4 is 0.188 because the whole operation time of the processor until DE4 occurs is 16 ms and the executing time of the first graphic task GT1 on the processor until DE4 occurs is 3 ms. Utilization of the processor at DE5 is 0.150 because the whole operation time of the processor until DE5 occurs is 20 ms and the executing time of the first graphic task GT1 on the processor until DE5 occurs is 3 ms. Utilization of the processor at DE6 is 0.167 because the whole operation time of the processor until DE6 occurs is 24 ms and the executing time of the first graphic task GT1 and the second graphic task GT2 on the processor until DE6 occurs is 4 ms.

Figure 7:
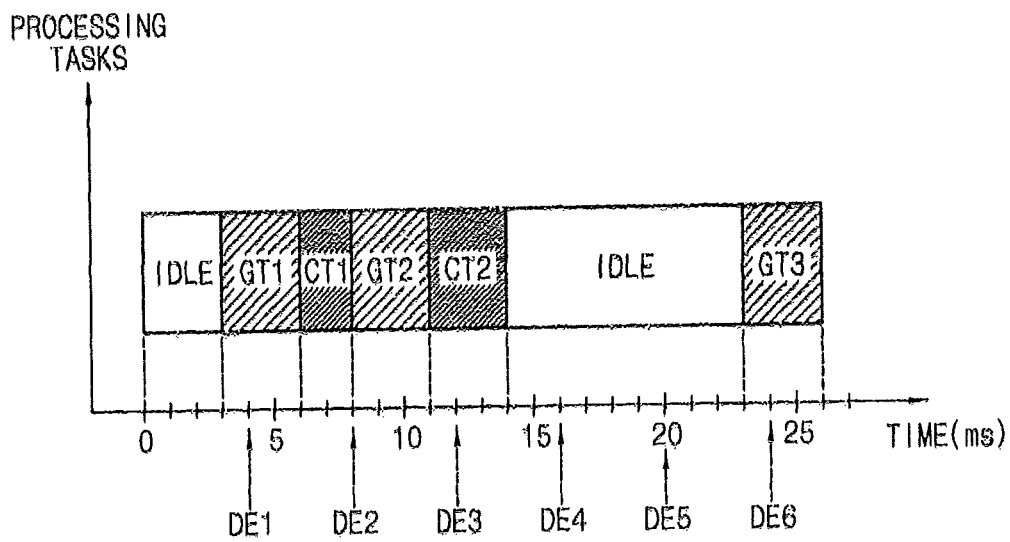
FIG. 7 is a graph illustrating an example embodiment of computing tasks and graphic tasks executed on the processor.

Referring to FIG. 7, the processor executes a first graphic task GT1, a second graphic task GT2, a third graphic task GT3, a first computing task CT1, and a second computing task CT2. From 0 ms to 3 ms, the processor is in the idle state IDLE, and does not execute a task. From 3 ms to 6 ms, the processor executes the first graphic task GT1. From 6 ms to 8 ms, the processor executes the first computing task CT1. From 8 ms to 11 ms, the processor executes the second graphic task GT2. From 11 ms to 14 ms, the processor executes the second computing task CT2. From 14 ms to 23 ms, the processor is in idle state ILDE, and does not execute a task. From 23 ms to 26 ms, the processor executes the third graphic task GT3.

Figure 8:
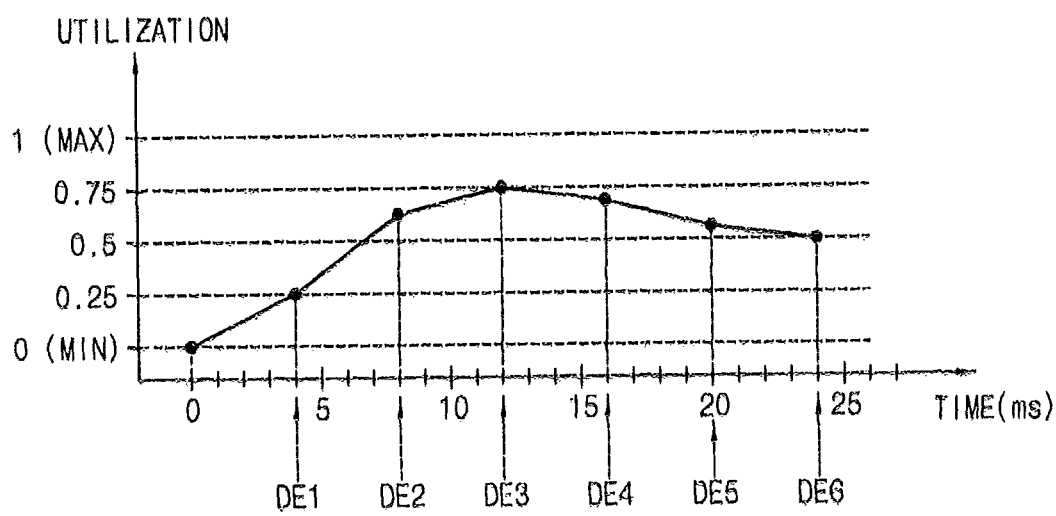
FIG. 8 is a graph illustrating utilization of the processor when the processor executes the computing tasks and the graphic tasks of FIG. 7.

Referring to FIG. 7 and FIG. 8, the first utilization of the processor at DE1 is 0.250 (e.g. 1/4) because the whole operation time of the processor until DE1 occurs is 4 ms, and the executing time of the first graphic task GT1 on the processor until DE1 occurs is 1 ms. The first utilization of the processor at DE2 is 0.625 (e.g. 5/8) because the whole operation time of the processor until DE2 occurs is 8 ms, the executing time of the first graphic task GT1 on the processor until DE2 occurs is 3 ms, and an executing time of the first computing task CT1 on the processor until DE2 occurs is 2 ms. The first utilization of the processor at DE3 is 0.750 (e.g. 9/12) because the whole operation time of the processor until DE3 occurs is 12 ms, the executing time of the first graphic task GT1 on the processor until DE3 occurs is 3 ms, an executing time of the first computing task CT1 on the processor until DE3 occurs is 2 ms, an executing time of the second graphic task GT2 on the processor until DE3 occurs is 3 ms, and an executing time of the second computing task CT2 on the processor until DE3 occurs is 1 ms. The first utilization of the processor at DE4 is 0.688 (e.g. 11/16) because the whole operation time of the processor until DE4 occurs is 16 ms, the executing time of the first graphic task GT1 on the processor until DE4 occurs is 3 ms, an executing time of the first computing task CT1 on the processor until DE4 occurs is 2 ms, an executing time of the second graphic task GT2 on the processor DE4 occurs is 3 ms, and an executing time of the second computing task CT2 on the processor until DE4 occurs is 3 ms. The first utilization of the processor at DE5 is 0.550 (e.g. 11/20) because the whole operation time of the processor until DE5 occurs is 20 ms, the executing time of the first graphic task GT1 on the processor until DE5 occurs is 3 ms, an executing time of the first computing task CT1 on the processor until DE5 occurs is 2 ms, an executing time of the second graphic task GT2 on the processor until DE5 occurs is 3 ms, and an executing time of the second computing task CT2 on the processor until DE5 occurs is 3 ms. The first utilization of the processor at DE6 is 0.500 (e.g. 12/24) because the whole operation time of the processor until DE6 occurs is 24 ms, the executing time of the first graphic task GT1 on the processor until DE6 occurs is 3 ms, an executing time of the first computing task CT1 on the processor until DE6 occurs is 2 ms, an executing time of the second graphic task GT2 on the processor until DE6 occurs is 3 ms, an executing time of the second computing task CT2 on the processor until DE6 occurs is 3 ms, and an executing time of the third graphic task GT3 on the processor DE6 occurs is 1 ms.

Figure 9:
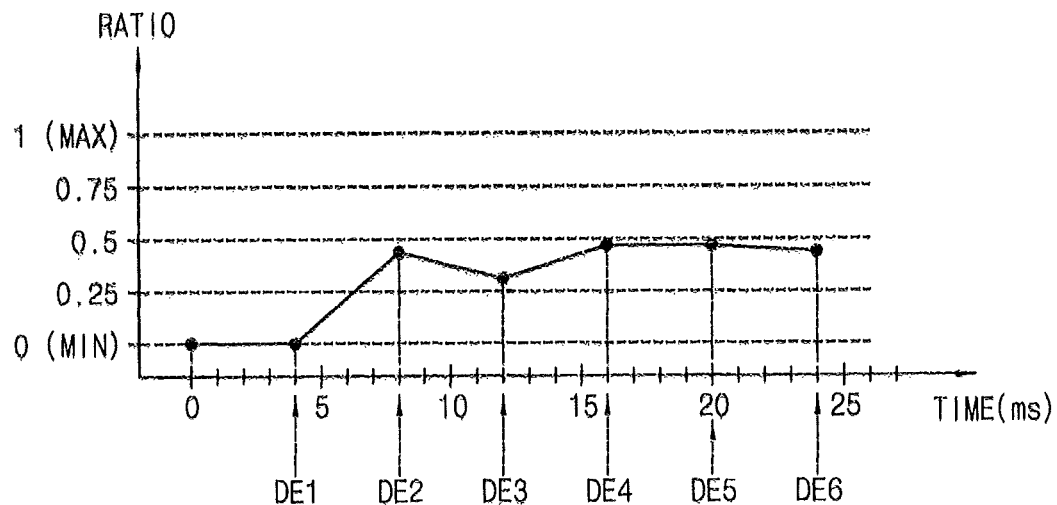
FIG. 9 is graph illustrating a ratio of the amount of the computing task to the amount of the tasks according to example embodiments, when the processor executes the computing task and the graphic task of FIG. 7.

Referring to FIG. 9, in a first example embodiment, the amount of the tasks (shown in FIG. 7) may be an executing time of the tasks on the processor, the amount of the graphic task may be an executing time of the graphic task on the processor, and the amount of the computing task may be an executing time of the computing task on the processor.

A second example embodiment is a variation to the first example embodiment wherein the amount of the task may be the number of the task units included in the tasks, the amount of the graphic task may be the number of the task units included in the graphic tasks, and the amount of the computing task may be the number of the task units included in the computing tasks.

FIG. 9 shows the procedure of applying the step S123 to the tasks of FIG. 7.

Because an executing time of the first graphic task GT1 (of FIG. 7) on the processor is 1 ms at DE1 and there is no computing task being performed at DE1, the second utilization is equal to the first utilization and is generated according to the step S121. In this case, the ratio of the amount of the computing task to the amount of the tasks at 4 ms is not calculated.

Because an executing time of the first graphic task GT1 on the processor is 3 ms and an executing time of the first computing task CT1 is 2 ms until 8 ms at DE2, the ratio of the amount of the computing task to the amount of the tasks at 8 ms is 0.400 (e.g. 2/5), and the computing utilization at 8 ms is 0.250 calculated by multiplying the first utilization at 8 ms (0.625) and the ratio of the amount of the computing task to the amount of the tasks at 8 ms (0.400).

Because an executing time of the first graphic task GT1 on the processor is 3 ms, an executing time of the second graphic task GT2 on the processor is 3 ms, an executing time of the first computing task CT1 on the processor is 2 ms, and an executing time of the second computing task CT2 on the processor is 1 ms at DE3, the ratio of the amount of the computing task to the amount of the tasks at 12 ms is 0.333 (e.g. 3/9). The computing utilization at 12 ms is 0.250 calculated by multiplying the first utilization at 12 ms (0.750) and the ratio of the amount of the computing task to the amount of the tasks at 12 ms (0.333).

Because an executing time of the first graphic task GT1 on the processor is 3 ms, an executing time of the second graphic task GT2 on the processor is 3 ms, an executing time of the first computing task CT1 on the processor is 2 ms, and an executing time of the second computing task CT2 on the processor is 3 ms at DE4, the ratio of the amount of the computing task to the amount of the tasks at 16 ms is 0.455 (e.g. 5/11), and the computing utilization at 16 ms is 0.313 calculated by multiplying the first utilization at 16 ms (0.688) and the ratio of the amount of the computing task to the amount of the tasks at 16 ms (0.455).

Because an executing time of the first graphic task GT1 on the processor is 3 ms, an executing time of the second graphic task GT2 on the processor is 3 ms, an executing time of the first computing task CT1 on the processor is 2 ms, and an executing time of the second computing task CT2 on the processor is 3 ms at DE5, the ratio of the amount of the computing task to the amount of the tasks at 20 ms is 0.455 (e.g. 5/11), and the computing utilization at 20 ms is 0.250 calculated by multiplying the first utilization at 20 ms (0.550) and the ratio of the amount of the computing task to the amount of the tasks at 20 ms (0.455).

Because an executing time of the first graphic task GT1 on the processor is 3 ms, an executing time of the second graphic task GT2 on the processor is 3 ms, an executing time of the third graphic task GT3 on the processor is 1 ms, an executing time of the first computing task CT1 on the processor is 2 ms, and an executing time of the second computing task CT2 on the processor is 3 ms at DE6, the ratio of the amount of the computing task to the amount of the tasks at 24 ms is 0.417 (e.g. 5/12), and the computing utilization at 24 ms is 0.209 calculated by multiplying the first utilization at 24 ms (0.500) and the ratio of the amount of the computing task to the amount of the tasks at 24 ms (0.417).

Calculating the graphic utilization by multiplying the first utilization and the ratio of the amount of the graphic task to the amount of the tasks at step S124 may be understood based on the description about calculating the computing utilization by multiplying the first utilization and the ratio of the amount of the computing task to the amount of the tasks at step S123.

Figure 10:
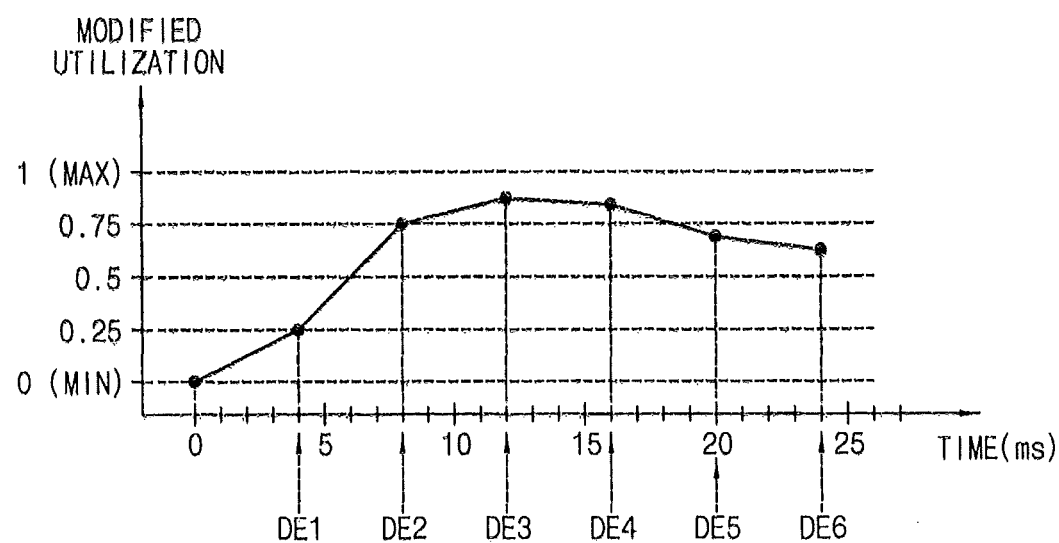
FIG. 10 is a graph illustrating an adjusted second utilization of the processor according to example embodiments when the processor executes the computing task and the graphic task of FIG. 7

FIG. 10 shows procedure of applying step S125 and step S126 to the tasks of FIG. 7. FIG. 10 shows the case that the weight is 1.5. In another example embodiment, the weight may be pre-determined by the user.

After executing step S125 and step S126, the second utilization MODIFIED UTILIZATION at 4 ms when the first DVFS event DE1 occurs is 0.250, the second utilization MODIFIED UTILIZATION at DE2 is 0.750, the second utilization MODIFIED UTILIZATION at DE3 is 0.874, the second utilization MODIFIED UTILIZATION at DE4 is 0.844, the second utilization MODIFIED UTILIZATION at DE5 is 0.675, and the second utilization MODIFIED UTILIZATION at DE6 is 0.604.

Figure 11:
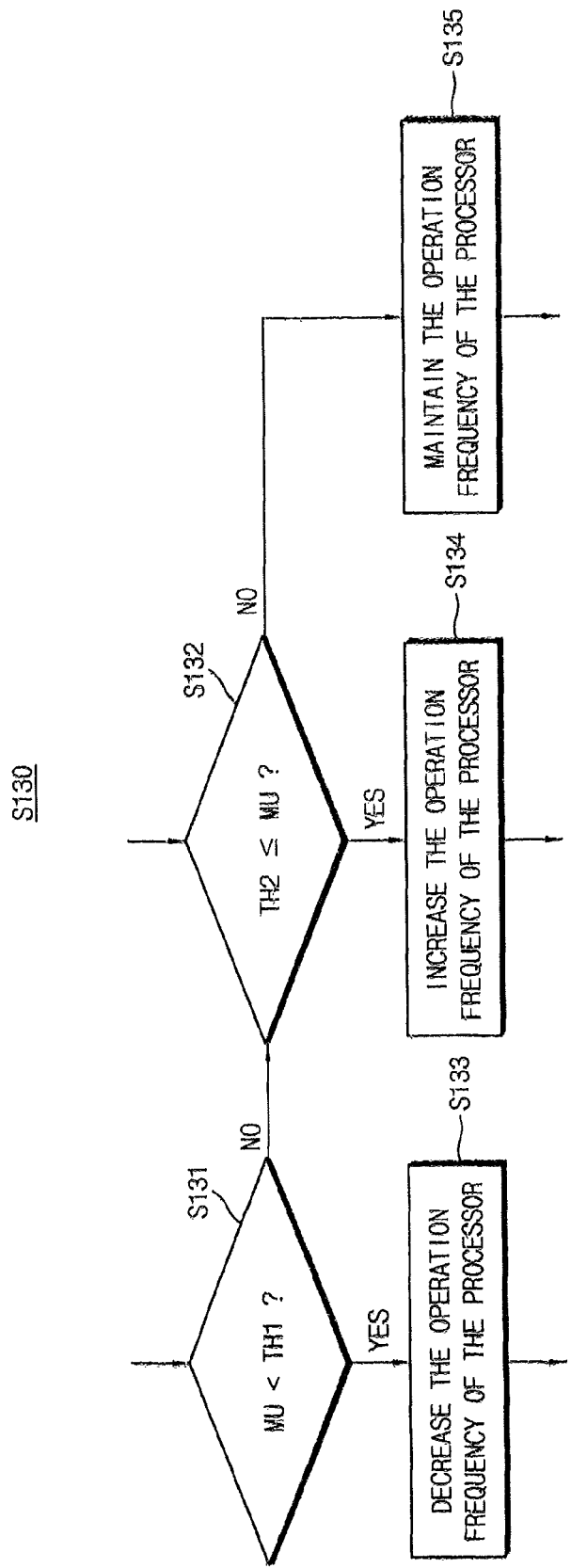
FIG. 11 is a flow chart illustrating determining the operation frequency of the processor based on the second utilization with the threshold values included in the flow chart of FIG. 1.

Referring to FIG. 11, determining the operation frequency of the processor based on the comparison of the second utilization with the threshold values at step S130 may include decreasing the operation frequency of the processor at S133 when the second utilization MU is less than a first threshold value TH1, (e.g. the conditional result of step S131 is YES).

Decreasing the operation frequency of the processor at step S133 when the second utilization is less than the first threshold value (e.g. the conditional result of step S131 is YES) may include maintaining the operation frequency of the processor when the operation frequency is equal to a minimum operation frequency of the processor.

Determining the operation frequency of the processor based on the comparison of the second utilization with the threshold values at step S130) may further include increasing the operation frequency of the processor at step S134 when the second utilization MU is equal to or larger than a second threshold value TH2 (e.g. the conditional result of step S131 is NO and step S132 is YES).

Increasing the operation frequency at step S134 of the processor when the second utilization is equal to or larger than the second threshold value (e.g. the conditional result of step S131 is NO and step S132 is YES) may include maintaining the operation frequency of the processor when the operation frequency is equal to a maximum operation frequency of the processor.

Determining the operation frequency of the processor based on the comparison of the second utilization with the threshold values at step S130 may further include maintaining the operation frequency of the processor at step S135 when the second utilization MU is equal to or larger than the first threshold value TH1 (e.g. the result of step S131 is NO) and the second utilization MU is less than the second threshold value TH2 (e.g. the result of step S132 is NO).

The threshold values may be pre-determined through a plurality of graphic task benchmark programs (e.g. 3DMark®, Basemark OS II, and BasemarkX).

Figure 12:
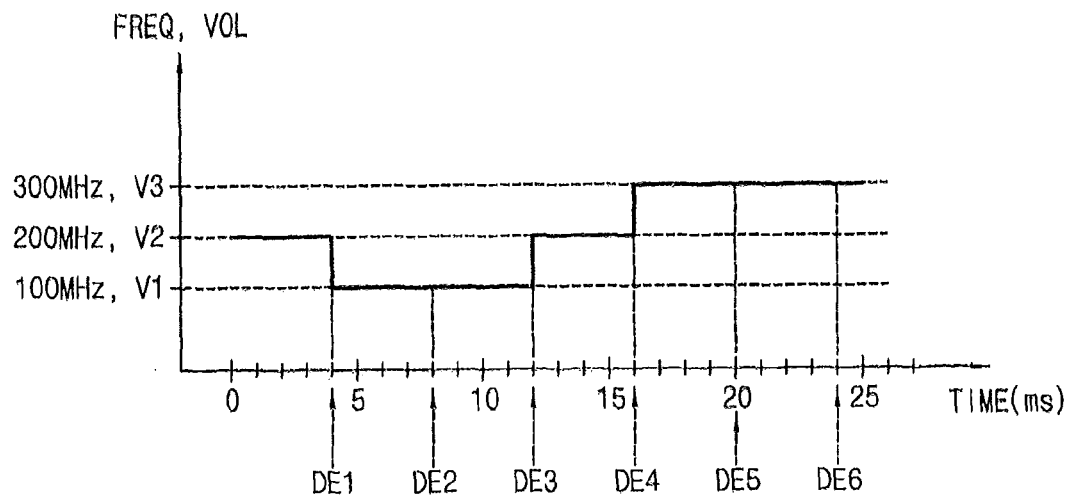
FIG. 12 is a graph illustrating operation frequency and operation voltage of the processor according to example embodiments when the processor executes the computing task and the graphic task of FIG. 7.

FIG. 12 is a graph illustrating operating frequency and operating voltage of the processor according to example embodiments when the processor executes the computing task and the graphic task of FIG. 7.

FIG. 12 illustrates a case where the first threshold value TH1 is 0.3 and the second threshold value TH2 is 0.8.

Because the second utilization MODIFIED UTILIZATION (e.g. MU) at DE1 is 0.25, this illustrates a case where the second utilization MU is less than the first threshold value TH1 (e.g. the result of step S131 is YES). Decreasing the operation frequency of the processor at step S133 may decrease the operation frequency of the processor from the second operation frequency of 200 MHz, which is a default operation frequency, to the first operation frequency of 100 MHz, and may decrease the operation voltage of the processor from the second operation voltage of V2 corresponding to the second operation frequency 200 MHz to the first operation voltage of V1 corresponding to the first operation frequency 100 MHz.

Because the second utilization MODIFIED UTILIZATION at DE2 is 0.75, maintaining the operation frequency of the processor at step S135 when the second utilization MU is equal to or larger than the first threshold value TH1 (e.g. the result of step S131 is NO) and the second utilization MU is less than the second threshold value TH2 (e.g. the result of step S132 is NO) may maintain the operation frequency of the processor as the first operation frequency 100 MHz, and may maintain the operation voltage of the processor as the first operation voltage V1.

Because the second utilization MODIFIED UTILIZATION at DE3 is 0.874, increasing the operation frequency of the processor at step S134 when the second utilization MU is equal to or larger than a second threshold value TH2 (e.g. the result of step S131 is NO an step 132 is YES) may increase the operation frequency of the processor from the first operation frequency 100 MHz to the second operation frequency 200 MHz, and may increase the operation voltage of the processor from the first operation voltage V1 corresponding to the first operation frequency 100 MHz to the second operation voltage V2 corresponding to the second operation frequency 200 MHz.

Because the second utilization MODIFIED UTILIZATION at DE4 is 0.844, increasing the operation frequency of the processor at step S134 when the second utilization MU is equal to or larger than a second threshold value TH2 (e.g. the result of step S131 is NO and step 132 is YES) may increase the operation frequency of the processor from the second operation frequency 200 MHz to the third operation frequency 300 MHz, and may increase the operation voltage of the processor from the second operation voltage V2 corresponding to the second operation frequency 200 MHz to the third operation voltage V3 corresponding to the third operation frequency 300 MHz.

Because the second utilization MODIFIED UTILIZATION at DE5 is 0.675, maintaining the operation frequency of the processor at step S135 when the second utilization MU is equal to or larger than the first threshold value TH1 (e.g. the result of step S131 is NO) and the second utilization MU is less than the second threshold value TH2 (e.g. the result of step S132 is NO) may maintain the operation frequency of the processor as the third operation frequency 300 MHz, and may maintain the operation voltage of the processor as the third operation voltage V3.

Because the second utilization MODIFIED UTILIZATION at DE6 is 0.604, maintaining the operation frequency of the processor at step S135 when the second utilization MU is equal to or larger than the first threshold value TH1 (e.g. the result of stop S131 is NO) and the second utilization MU is less than the second threshold value TH2 (e.g. the result of step S132 is NO) may maintain the operation frequency of the processor as the third operation frequency 300 MHz, and may maintain the operation voltage of the processor as the third operation voltage V3.

Figure 13:
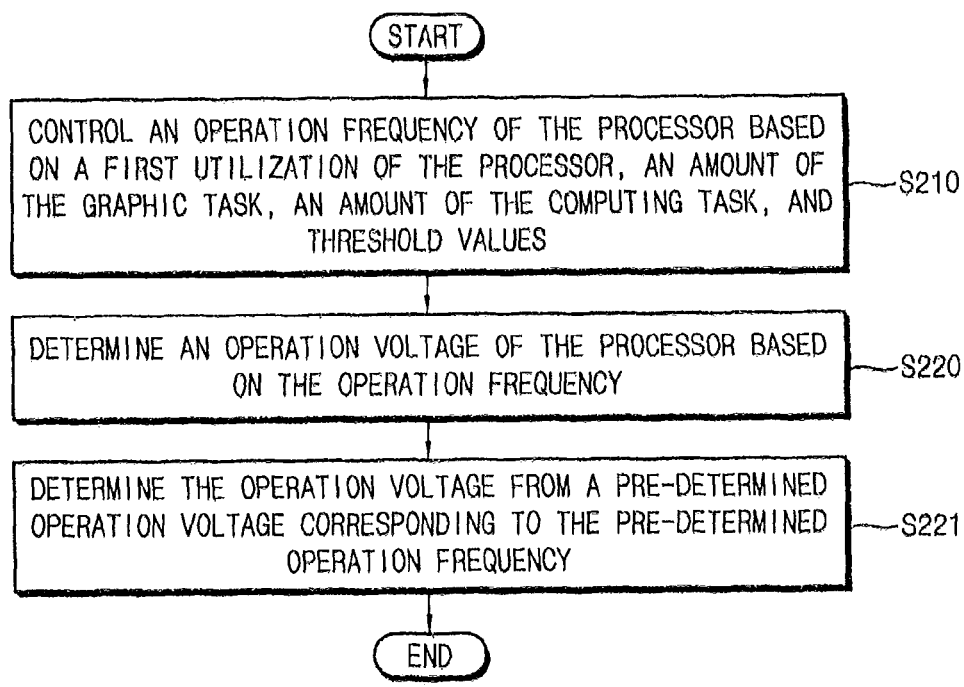
FIG. 13 is a flow chart illustrating another DVFS method according to another example embodiment.

Referring to FIG. 13, when a processor executes tasks including at least one of a graphic task and a computing task, a method of DVFS of the processor includes controlling an operation frequency of the processor based on a first utilization of the processor, an amount of the graphic task, an amount of the computing task, and threshold values at step S210 and a determining an operation voltage of the processor based on the operation frequency at step S220.

Figure 14:
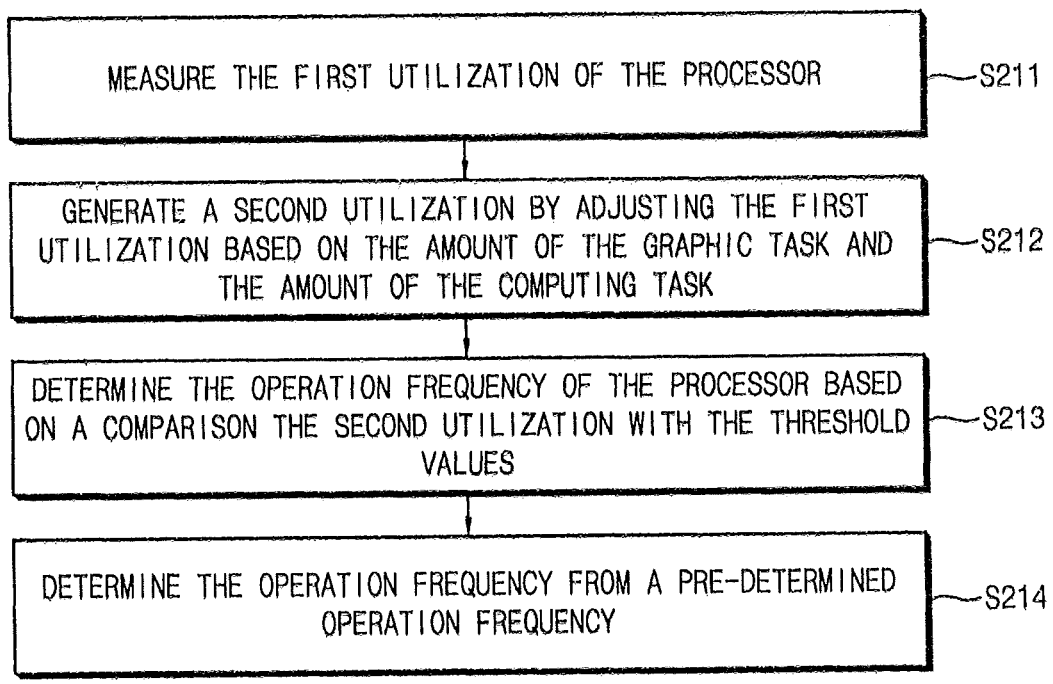
FIG. 14 is a flow chart illustrating controlling the operation frequency of the processor based on the first utilization of the processor, the amount of the graphic task, the amount of the computing task, and the threshold values included in the flow chart of FIG. 13.

Referring to FIG. 14, controlling the operation frequency of the processor based on the first utilization of the processor, the amount of the graphic task, the amount of the computing task, and the threshold values at step S210 may include measuring the first utilization of the processor at step S211, generating a second utilization by adjusting the first utilization based on the amount of the graphic task and the amount of the computing task at step S212, and determining the operation frequency of the processor based on a comparison of the second utilization with the threshold values at step S213.

In an example embodiment, determining the operation frequency of the processor based on the comparison of the second utilization with the threshold values at step S213 may include determining the operation frequency of the processor from a pre-determined operation frequency at step S214.

In an example embodiment, determining the operation voltage of the processor based on the operation frequency at step S220 may include determining the operation voltage from a pre-determined operation voltage corresponding to the pre-determined operation frequency at step S221.

The steps S211, S212, S213, S214, and S221 may be understood based on the references to FIG. 7 through FIG. 12.

Figure 15:
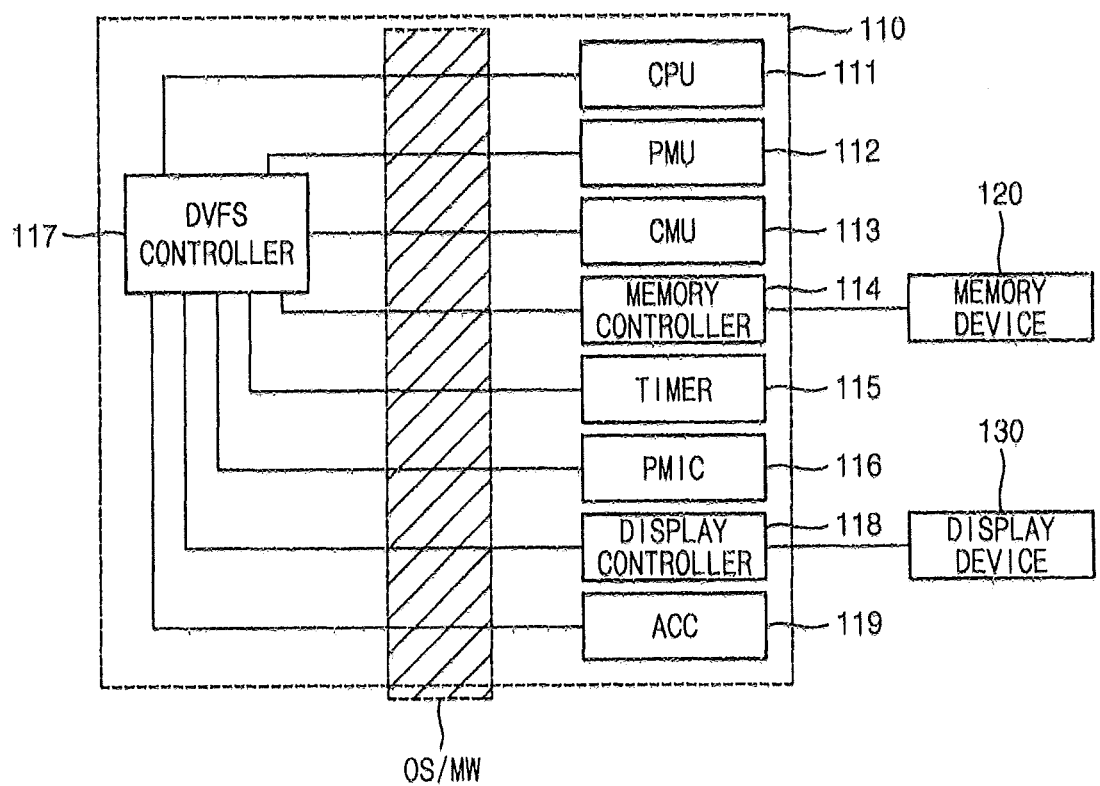
FIG. 15 is a block diagram illustrating an electronic system including a DVFS controller according to example embodiments.

Referring to FIG. 15, an electronic system 100 may include an application processor 110, a memory device 120, and a display device 130. The electronic system 100 may be implemented as a handheld device such as a mobile phone, a smart phone, a tablet computer, a personal digital assistant (PDA), an enterprise digital assistant (EDA), a digital still camera, a digital video camera, a portable multimedia player, a personal navigation device, a handheld game consol, or an e-book.

The application processor 110 may include the CPU core 111, the PMU 112, a clock management unit (CMU) 113, a display controller 118, a timer 115, a memory controller 114, and an accelerator 119.

The CPU core 111 may process or execute programs or data stored in the memory device 120. For example, the CPU core 111 may process or execute the programs or data in response to a clock signal output from a clock signal generator (not illustrated).

The CPU core 111 may be implemented by a multi-core processor. The multi-core processor is a single computing component with two or more independent processors (referred to as cores). Each of the processors may read and execute program instructions. The multi-core processor can drive a plurality of accelerators at a time, and therefore, a data processing system including the multi-core processor may perform multi-acceleration.

The programs or the data stored in the memory device 120 may be loaded into a memory included in the CPU core 11 when necessary, for embodiments were the CPU core 111 includes a memory. The memory device 120 may include ROM and RAM, or either ROM or RAM. The ROM may be implemented by erasable programmable ROM (EPROM) or electrically erasable programmable ROM (EEPROM). The RAM may temporarily store programs, data, or instructions.

The accelerator 119 may refer to a hardware device or a co-processor for increasing the performance of processing multimedia or multimedia data such as text, audio, still images, animation, video, two-dimensional data, or three-dimensional data.

The CMU 113 may generate one or more operating clock signal(s). In some embodiments, the CMU 113 may include a phase-locked loop (PLL), a delayed-locked loop (DLL), or a crystal oscillator. The CMU 113 generates one or more operating clock signal(s) to the CPU core 111 or other circuits. The CMU 113 may be used to vary the frequency of an operating clock signal in response to control information provided by DVFS controller 117. For example, the DVFS controller 117 may control the CMU 113 according to DVFS methods described in the references to FIG. 1 and FIG. 13.

The PMU 112 may control a supply or cutoff of driving voltages provided to a plurality of power domains in the application processor 110 in response to the control information provided by DVFS controller 117.

The memory controller 114 is an interface between the external memory device 120 and the application processor 110 and may control the overall operation of the memory device 120, as well as data exchanges between a host and the memory device 120. For example, the memory controller 114 may control the operation of the memory device 120 during read and write operations resulting from data requests made by the host. From the standpoint of the external memory device 120, the host may be, at any moment in time, any one of a number of "master devices", including by way of nonlimiting example the CPU core 11, the accelerator 119, or the display controller 118.

The memory device 120 serves as a data storage medium capable of receiving, storing, and providing indicated data under the control of a conventionally understood OS, various programs and various data. In some embodiments, the memory device 120 may be implemented with volatile memory such as DRAM. In other embodiments, the memory device 120 may be implemented with non-volatile memory such as flash memory, phase-change RAM (PRAM), magneto-resistive RAM (MRAM), resistive RAM (ReRAM) or ferroelectric RAM (FeRAM). The memory device 120 may be embedded within the application processor 110.

The display device 130 may display images defined by multimedia data provide by operation of the accelerator 119, or a software accelerator loaded to the CPU core 111. The display device 130 may be a light emitting diode (LED) display device, an organic LED (OLED) display device, or another type of display device. The display controller 118 may control operations of the display device 130.

Figure 16:
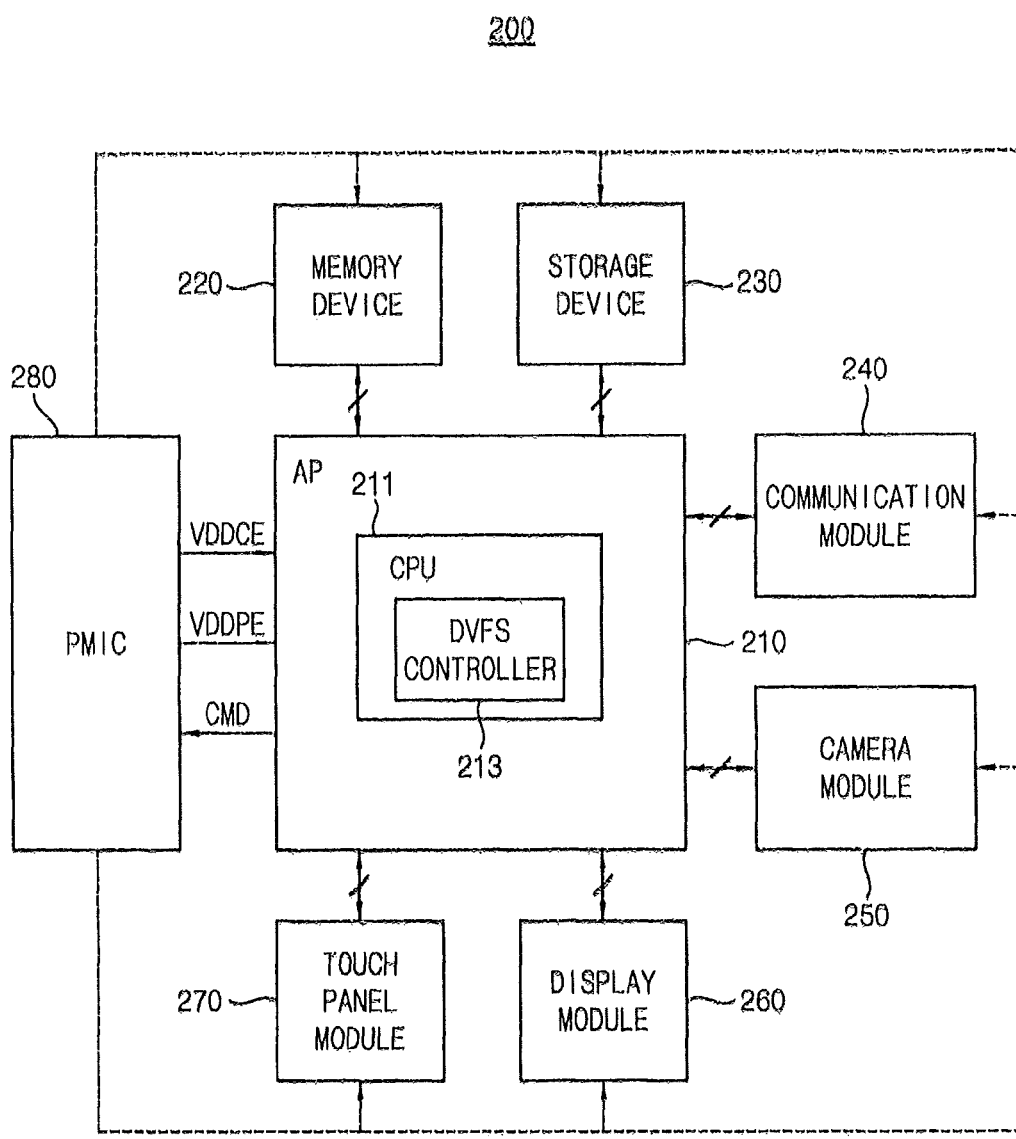
FIG. 16 is a block diagram illustrating a mobile device according to example embodiments.

Referring to FIG. 16, a mobile device 200 includes an application processor 210, a memory device 220, a storage device 230, multiple functional modules 240, 250, 260, and 270, and a power management device 280 that provides an operating voltage to the application processor 210, the memory device 220, the storage device 230, and the functional modules 240, 250, 260, and 270, respectively.

The application processor 210 controls the overall operation of the mobile device 200. For instance, the application processor 210 controls the memory device 220, the storage device 230, and the functional modules 240, 250, 260, and 270. The application processor 210 may include a CPU core 211. A DVFS controller 213 implemented in the CPU core 211 may transmit to the power management device 280 a command CMD directing a driving mode of the power management device 280 according to a DVFS policy determined by the application processor 210. The DVFS controller 213 may generate the command CMD based on the DVFS method described in the references in FIG. 1 and FIG. 13.

The application processor 210, as described above, may provide the power management device 280 with the command CMD that directs a driving mode of the first and second driving voltages VDDCE and VDDPE having a correlationship, which are provided from the power management device 280 according to the DVFS policy determined based on the operation of IPs in the mobile device 200. The power management device 280 maintains the level of the first driving voltage VDDCE in the first driving mode and changes the first driving voltage VDDCE in cooperation with a change of the second driving voltage VDDPE in the second driving mode, in response to the command CMD.

The memory device 220 and the storage device 230 store data for operations of mobile device 200. The memory device 220 may correspond to a volatile semiconductor memory device such as a dynamic random access memory (DRAM) device, a static random access memory (SRAM) device, a mobile DRAM, etc. In addition, the storage device 230 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some embodiments, the storage device 230 may correspond to a solid state drive (SSD) device, a hard disk drive (HDD) device, or a CD-ROM device for example.

The functional modules 240, 250, 260, and 270 perform various functions of the mobile device 200. For example, the mobile device 200 may comprise a communication module 240 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, a camera module 250 that performs a camera function, a display module 260 that performs a display function, and a touch panel module 270 that performs a touch sensing function. In some embodiments, the mobile device 200 further includes a global positioning system (GPS) module, a microphone (MIC) module, a speaker module, and a gyroscope module. However, the type of the functional modules 240, 250, 260, and 270 in mobile device 200 is not limited thereto.

Figure 17:
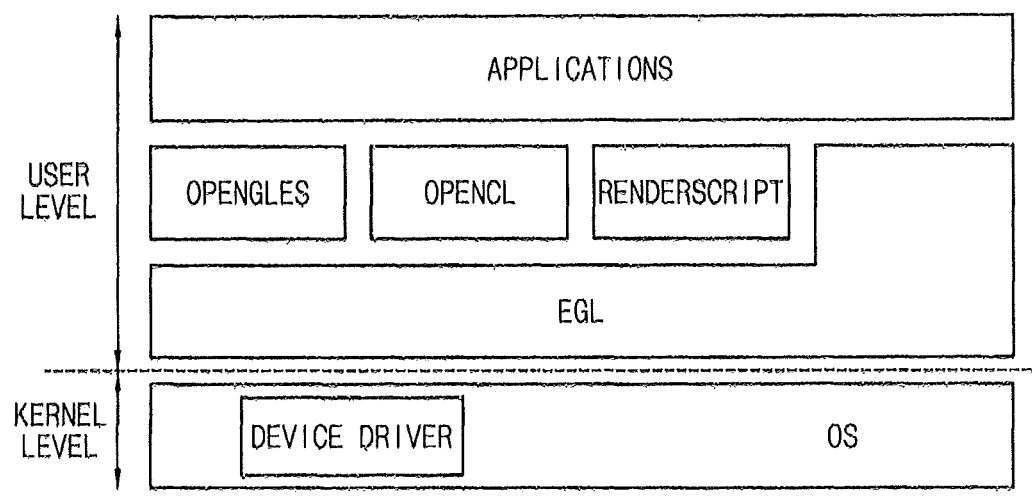
FIG. 17 is a diagram illustrating a program's logic level where a dynamic voltage frequency scaling method according to example embodiments is implemented.

Referring to FIG. 17, the program's logic level may include a user level USER LEVEL and a kernel level KERNEL LEVEL. The user level USER LEVEL may include an application level APPLICATIONS. The user may write an operation code on the application level APPLICATIONS. The user level USER LEVEL may include OpenGL® ES, OpenCL, RenderScript, and EGL™, which transfers the operation code wrote by the user to the kernel level KERNEL LEVEL.

The OpenGL ES is a sub set of OpenGL which is a 3D graphic API defined by Khronos group. The OpenGL ES is a 3D API for mobile devices such as a smart phone or tablet PC. The OpenGL ES already supports various types of mobile graphic processor, and is widely used in android environment.

The OS runs on the kernel level KERNEL LEVEL. The OS may include a device driver DEVICE DRIVER where the DVFS method described in the references to FIG. 1 and FIG. 13 is implemented.

The OS may provide DVFS events to the device driver DEVICE DRIVER periodically to change the operation frequency and the operation voltage of the processor dynamically.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of Dynamic Voltage Frequency Scaling (DVFS) of a processor comprising:
   measuring a first utilization of the processor utilized to execute both of a graphic task and a computing task;
   generating a second utilization by adjusting the first utilization based on a duration of the graphic task and a duration of the computing task;
   determining an operation frequency of the processor based on a comparison of the second utilization with at least one threshold value; and
   modifying the operation frequency of the processor from a first operation frequency to a second operation frequency in accordance with the comparison,
   wherein generating the second utilization by adjusting the first utilization based on the duration of the graphic task and the duration of the computing task includes:
      calculating a computing utilization by multiplying the first utilization and a computing ratio of the duration of the computing task to a duration of a total task;
      calculating a graphic utilization by multiplying the first utilization and a graphic ratio of the duration of the graphic task to the duration of the total task;
      generating a weighted computing utilization by multiplying a weight and the computing utilization; and
      generating the second utilization by adding the weighted computing utilization and the graphic utilization.

2. The method of claim 1, wherein the duration of the total task is an executing time of the total task on the processor, the duration of the graphic task is an executing time of the graphic task on the processor, and the duration of the computing task is an executing time of the computing task on the processor.

3. The method of claim 1, wherein a first duration of the total task is equal to a first number of task units included in the total task, a second duration of the graphic task is equal to a second number of task units included in the graphic task, and a third duration of the computing task is equal to a third number of the task units included in the computing task.

4. The method of claim 1, wherein determining the operation frequency of the processor based on the comparison of the second utilization with the at least one threshold value includes:
   decreasing the operation frequency of the processor when the second utilization is less than a first threshold value.

5. The method of claim 1, wherein the at least one threshold value is pre-determined through a plurality of graphic task benchmark programs.

6. The method of claim 1, wherein the first utilization is a ratio of an executing time of the total task on the processor to a whole operation time of the processor.

7. The method of claim 1, wherein the processor is one of a graphics processing unit and a general computing processing unit.

8. The method of claim 1, wherein the processor executes at least one of the graphic task and the computing task by using an OpenCL framework.

9. The method of claim 1, wherein measuring the first utilization of the processor is performed when a DVFS event occurs in an operating system running on the processor.

10. A mobile device comprising:
    an application processor (AP) configured to execute both of a graphic task and a computing task; and
    a power management device configured to modify an operation frequency of the AP from a first operation frequency to a second operation frequency in response to a determination of a modified utilization of the AP, the modified utilization based on a duration of the graphic task and a duration of the computing task,
    wherein the modified utilization of the AP is determined by
       calculating a computing utilization by multiplying a total utilization and a computing ratio of the duration of the computing task to a duration of a total task;
       calculating a graphic utilization by multiplying the total utilization and a graphic ratio of the duration of the graphic task to the duration of the total task;
       generating a weighted computing utilization by multiplying a weight and the computing utilization; and
       generating the modified utilization by adding the weighted computing utilization and the graphic utilization.

11. The mobile device of claim 10, wherein the power management device is configured to determine the modified utilization at fixed intervals by calculating a ratio of the total elapsed time of at least one of the graphic task and the computing task over a whole interval comprising a plurality of fixed intervals.

12. The mobile device of claim 10, wherein the power management device is configured to reduce the operation frequency of the AP when the modified utilization is less than a low threshold and the AP executes at least one computing task.

13. The mobile device of claim 10, wherein the power management device is configured to increase the operation frequency of the AP when the modified utilization is greater than a high threshold and the AP executes at least one computing task.

14. The mobile device of claim 10, further comprising a communication module configured to receive a display data, a display module configured to display images, and the AP executing a graphic task to render the display images from the display data.

* * * * *